(12) United States Patent
O'Brien

(10) Patent No.: US 6,276,381 B1
(45) Date of Patent: Aug. 21, 2001

(54) PROTECTIVE COVERING DEVICE

(76) Inventor: Paul W. O'Brien, 124 Belmont Ter., Scranton, PA (US) 18508

(*) Notice: Subject to any disclaimer, the term of this patent is extended or adjusted under 35 U.S.C. 154(b) by 0 days.

(21) Appl. No.: 09/152,912

(22) Filed: Sep. 14, 1998

(51) Int. Cl.$^7$ ................................................. E04H 15/00
(52) U.S. Cl. ........................... 135/87; 135/128; 135/115; 135/903; 135/121; 296/136
(58) Field of Search ..................... 135/121, 122–126, 135/128, 115, 117, 119, 903, 904, 906, 907, 88.01, 88.13, 127; 296/136

(56) References Cited

U.S. PATENT DOCUMENTS

| | | |
|---|---|---|
| 1,719,055 | 7/1929 | Herzer . |
| 1,918,423 | 7/1933 | Persinger . |
| 1,999,171 | 4/1935 | Bryant . |
| 2,097,923 | 11/1937 | Hutchinson . |
| 2,598,940 | 6/1952 | Robie . |
| 2,609,042 | 9/1952 | Chamberlain . |
| 2,798,501 | 7/1957 | Oliver . |
| 2,995,137 | 8/1961 | Cothern . |
| 4,315,535 | 2/1982 | Battle . |
| 4,720,135 * | 1/1988 | Farina .................. 296/136 |
| 4,727,898 * | 3/1988 | Guma .................. 296/136 |
| 4,834,128 | 5/1989 | Burgess . |
| 4,856,842 | 8/1989 | Ross et al. . |
| 4,886,083 | 12/1989 | Gamache . |
| 4,991,612 | 2/1991 | Kiss et al. . |
| 5,013,079 | 5/1991 | Ho . |
| 5,350,000 | 9/1994 | Wang . |
| 5,501,502 | 3/1996 | Wang . |
| 5,740,826 | 4/1998 | Nevin et al. . |
| 5,746,237 | 5/1998 | Arnic . |
| 5,941,593 * | 8/1999 | McCann .............. 296/136 |

* cited by examiner

Primary Examiner—Beth A. Stephan
(74) Attorney, Agent, or Firm—Charles A. Wilkins

(57) ABSTRACT

A protective covering device having a weather-resistant sheet of material wound about a spring-loaded roller, which material may be extended off the roller and over an object to be covered in a relatively easy manner, and which material may then be spring-assisted back onto the roller during the uncovering of such object. Simple air buffered deceleration of the cover as it settles over the object to be covered is designed into the apparatus of the invention.

26 Claims, 10 Drawing Sheets

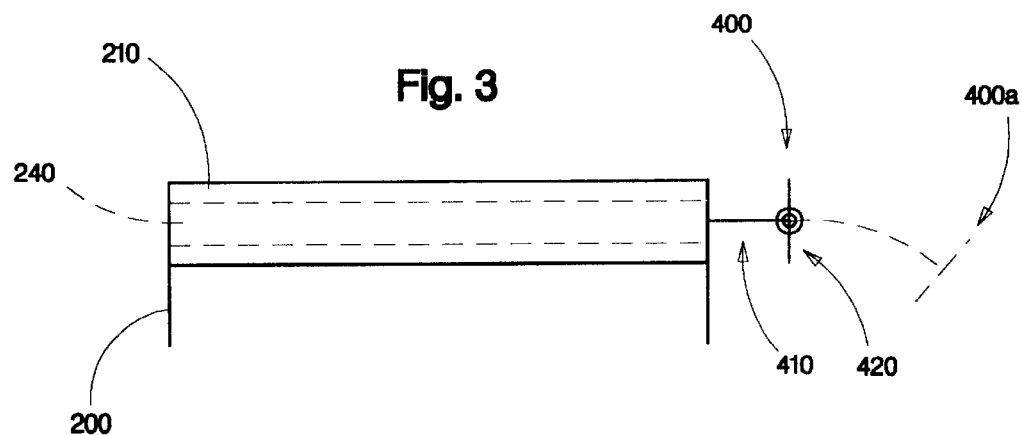
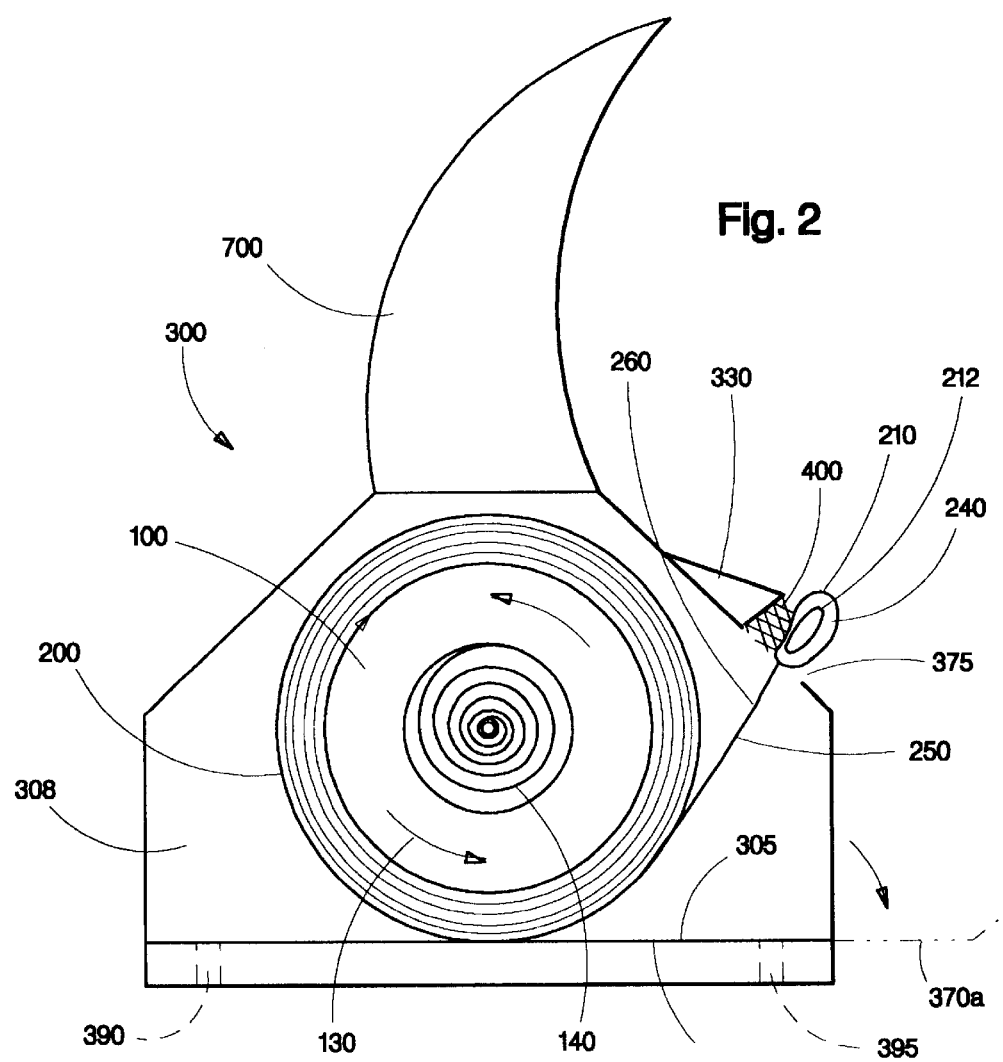

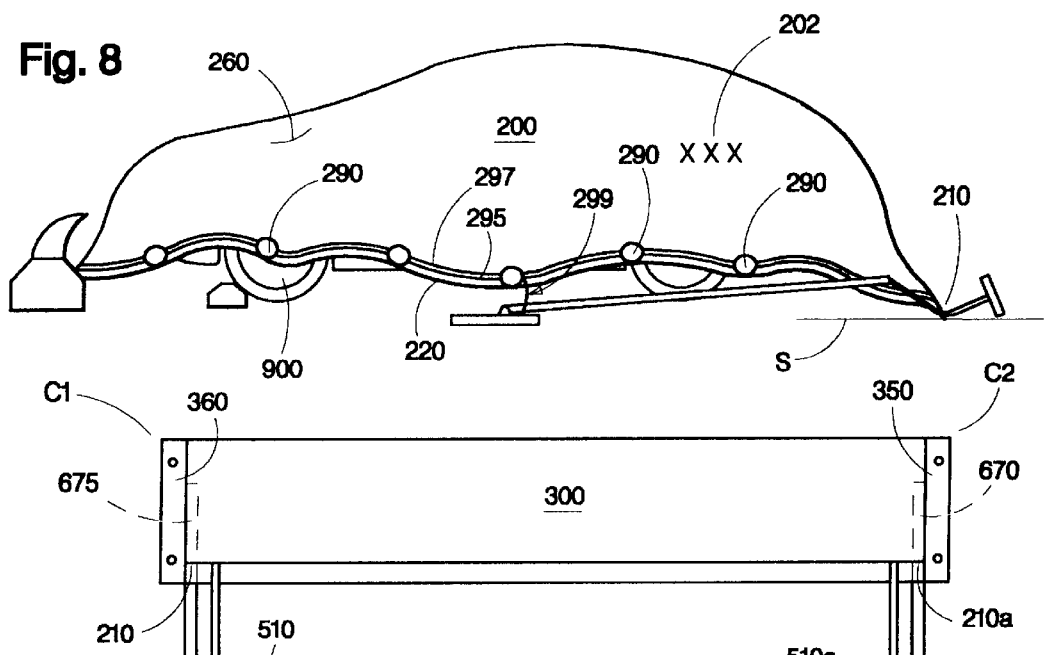
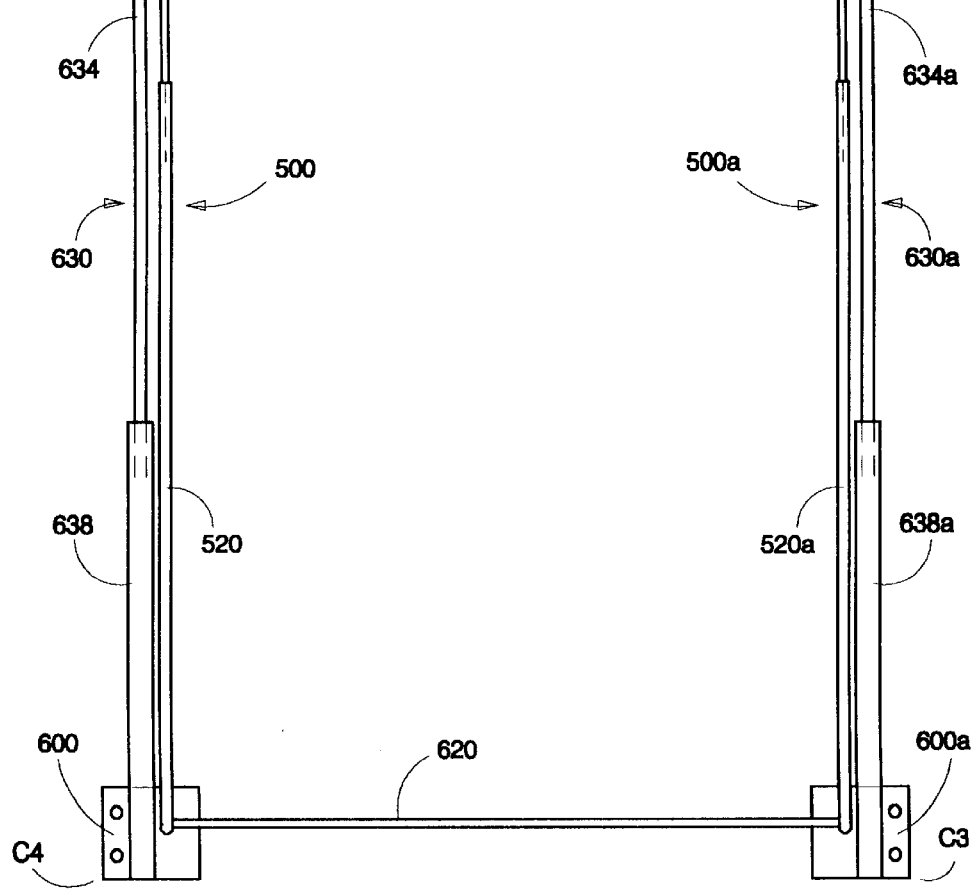

PROTECTIVE COVERING DEVICE

BACKGROUND OF THE INVENTION

1. Field of the Invention

This invention relates to protective covering devices generally, and more particularly, to a protective covering device for motor vehicles, and/or similarly situated objects, exposed to the natural elements while parked or at rest temporarily, or for an extended period of time, such device being easy to operate, transport and store.

2. Preliminary Discussion

Protective vehicle covers come in all shapes and sizes. Of course, the most permanent type of vehicle cover is the "attached" or "detached" garage, which is either connected to a residence or situated adjacent thereto, but still within the property line. The least permanent type of covering for a large object such as a motor vehicle is usually in the form of a weather-resistant, one-piece cover, or custom-designed fitted cover. For vehicle owners residing in apartment buildings without attached or detached garages, for example, this is usually the only available option. Obviously, the most expensive and effective type of covering is the garage. However, one-piece fitted covers and the like can also become expensive if they are stolen, which is often a problem in today's society, or if the owner changes cars, thereby necessitating the purchase of a new "fitted" cover.

Temporary or permanent vehicle covers primarily serve the purpose of providing protection against the natural elements, such as wind, rain and more particularly acid rain, airborne debris, sun, dust, leaves and branches, mischievous youth, animal droppings and other organic matter, and the like. More particularly, temporary covers may be desirable to vehicle owners for several reasons. They are particularly appealing in today's upwardly mobile, transient society, since they are easily transportable to any new location. Temporary covers are also desirable away from the home at short term parking locations such as at one's place of employment, or at long term parking locations such as at a self-storage facility or an airport. Temporary covers would also be desirable for new and used car dealers and rental agencies, particularly since vehicle appearance is a driving factor in customer satisfaction and appreciation.

Protective covers are, however, only effective if they are easily and conveniently available and hassle-free. For example, storing one's vehicle in an attached garage is essentially effortless, and usually only requires the push of a button on an automatic garage door opener. Storing one's vehicle under a custom-fitted cover, however, can be quite discouraging at times, particularly when the cover is wet and cluttered with debris. One going to work on a dreary, rainy morning, or even during storm conditions, would generally not look forward to removing, cleaning, and storing a custom-fitted car cover that is completely soaked and lined with fallen debris, particularly since one is likely to get wet and dirty in the process, and more particularly if there is no convenient, dry storage location for the now-soaked car cover, which is also now susceptible to mildew damage and the like. In fact, situations such as just described sometimes tend to make temporary vehicle covers a hassle to use and store.

3. Description of Related Art

Unfortunately, although the objective has always been to provide the user with convenience in protecting his/her vehicle, prior art vehicle covers have been often cumbersome in design and/or tedious and complicated in use. There is a clear evolution within the temporary vehicle cover art, progressing from the simple to the complex. This evolution demonstrates a clear need to reevaluate and reassess the factors that drive the decision to purchase and use temporary vehicle covers. It appears that the prior art has become cluttered with complicated devices that undoubtedly provide protection, but appear to neglect the totality of human purchasing and use factors, namely easy of use, storage, transportation and relocation.

The earliest genre of temporary vehicle covers employed bumper-mounted, roll-carrying weather-resistant sheets. For example, U.S. Pat. No. 1,719,055 issued to J. H. Herzer on Jul. 2, 1929, entitled "Combination Bumper, Container, Tent, and Car Cover," discloses a bumper-attached roll of material that when drawn out, may be used as a tent externally of the vehicle or drawn over the vehicle and used as a car cover or the like. U.S. Pat. No. 1,918,423 issued to N. L. Persinger on Jul. 18, 1933, entitled "Automobile Cover Apparatus," discloses a rear bumper-mounted roll of material employing a draw string or cord to facilitate the extension of the cover over the automobile. The Persinger cover appears to be an enhancement over the Herzer cover, with the addition of a pull string and snap retained side cover flaps or extensions. A unique modification of the Herzer and Persinger apparatus is seen in U.S. Pat. No. 1,999,171 issued to C. L. Bryant on Apr. 30, 1935, entitled "Protective Device for Automobiles," which discloses a dual roller variation of an automobile cover mounted not on a bumper, but on an automobile roof. Another roof-mounted cover can be seen in U.S. Pat. 2,609,042 issued to J. C. Chamberlain on Sep. 2, 1952, entitled "Automobile Canopy," which discloses a portable, suction mounted dual roller housing positionable on the roof either longitudinally, whereby each cover would extend and enclose the car itself, or laterally, whereby the cover would extend to the sides of the automobile providing a tent like awning or shelter for an individual adjacent the exterior of the car.

Vehicle mounted covers would likely not fare well with today's aerodynamic, streamlined bodies, particularly since many of the newer vehicles are formed from easily-damageable plastic parts. One recent contribution to the art, namely, U.S. Pat. No. 4,856,842 issued to R. E. Ross et al. on Aug. 15, 1989, entitled "Self-Storing, Retractable Automobile Cover," which discloses a removably attached, power operated, automobile cover for placement on the front or rear bumper of an automobile, requires the attachment of a pair of tubular mounting lugs to the chassis. It would appear that the most convenient type of car covering would not require the addition or removal of extraneous mounting means to or from the vehicle body. Another recent contribution is U.S. Pat. No. 5,013,079 issued to C. Ho on May 7, 1991, entitled "Telescopically-Operated Vehicle Canopy," which discloses a body mounted, gear driven canopy cover designed to telescopically cover and protect a vehicle. The Ho apparatus requires a physical alteration to the vehicle. Similarly, U.S. Pat. No. 5,501,502 issued to S. Wang on Mar. 26, 1996, entitled "Foldable Vehicle Cover," discloses a vehicle attached car cover stored in the actual frame of the vehicle such that it forms almost a secondary bumper facade.

The next generation of vehicle covers can be seen in U.S. Pat. No. 2,097,923 issued to C. W. Hutchinson on Nov. 2, 1937, entitled "Car Protector," which discloses a wall mounted or free standing car cover having a roller operated sheet of material that extends over a car and preferably hooks or attaches or is firmly secured to the rear bumper thereof. The Hutchinson reference is a departure from the previously described references in that such cover is not car or bumper mounted. A variation of the Hutchinson reference can be seen in U.S. Pat. No. 4,834,128 issued to J. M. Burgess on May 30, 1989, entitled "Automobile Cover Device," which discloses a tire positioning placement guide to maintain a car in a fixed position for receiving a flexible cover draped thereon. Another variety of this type of covering is shown in U.S. Pat. No. 2,995,137 issued to W. F. Cothern on Aug. 8, 1961, entitled "Vehicle Rain Shelter," which discloses a flexible covering specifically designed to protect the front windshield of a vehicle at drive-in theaters or the like. Yet a further variety of this type can be seen in U.S. Pat. No. 4,991,612 issued to J. Kiss et al. on Feb. 12, 1991, entitled "Storage Mechanism for Vehicle Covering," which discloses a removably attachable support structure for coveting, with such covering also designed to be removably detached from the storage reel once such covering is placed over a vehicle.

Another genre of vehicle covers could be termed the "ribbed"-type covers, since they generally feature ribs or stiff bracing members positioned along the cover canopy. An example of this type of cover can be seen in U.S. Pat. No. 2,598,940 issued to F. D. Robie on Jun. 3, 1952, entitled "Collapsible Cover for Vehicles," which discloses a series of "bows" about which flexible material is stretched, in a foldable or retractable structure designed to extend over the exterior of the vehicle, with means to attach the cover to the underbelly of such vehicle. Another example can be seen in U.S. Pat. No. 2,798,501 issued to J. F. Oliver on Jul. 9, 1957, entitled "Collapsible Housing Structure," which discloses a similarly formed structure having a tire-placement piece for proper positioning of the vehicle prior to extension of the housing about the vehicle. U.S. Pat. No. 4,886,083 issued to M. Gamache on Dec. 12, 1989, entitled "Vehicle Cover," discloses a variation of the Robie and Oliver references, having an extendable ground-rail and a longitudinally extendable foundation, while U.S. Pat. No. 5,740,826 issued to M. P. Nevin et al. on Apr. 21, 1998, entitled "Collapsible Storage Structure," discloses a variation on the previously described Gamache reference, further comprising a slide rail type assembly with means to support the fully extended cover on the ground and additional means to lock the structure in a closed position. Finally, U.S. Pat. No. 5,746,237 recently issued to G. A. Arnic on May 5, 1998, entitled "Portable Garage," discloses a gear driven, automatic, portable carport that may be triggered by the movement of the car into or away from the carport, or it may be activated electronically by external means.

In addition, some unique contributions to the art can be seen in U.S. Pat. No. 4,315,535 issued to D. S. Battle on Feb. 16, 1982, entitled "Flood Protection Container for Vehicles," which discloses in essence a big baggy for a car designed to completely enclose the car during potential flood situations, and U.S. Pat. No. 5,350,000 issued to S. B. Wang on Sep. 27, 1994, entitled "Inflatable Multi-Air-Bag Cover for Cars," which discloses a multi-unit inflatable cushion for the exterior of a car.

The present inventor has recognized numerous deficiencies within the prior art. First, several of the prior art designs either attach directly to the owner's vehicle or require a structural modification thereof. It is believed that the most useful type of protective device should be the least intrusive to the chassis of the owner's vehicle. Another problem recognized by the present inventor is a lack of weather resistance in prior art framing structures. Many of the recent introductions to the field operate on a sliding track system, where the track itself is exposed to the elements. Of course, this presents problems in those areas of the country that experience a lot of storm-related debris or changing of the seasons. Furthermore, the more recent "ribbed" type car covers can be quite bulky at times, particularly when the covering includes series of stiffening members that add weight to the cover, involve additional, often complicated manufacturing steps, and create the potential for breakage, thereby disrupting the entire protective system. The ribbed-type car covers also create a type of fixed geometry, whereby the spatial dimensions of the cover are not easily modified and workable.

There is a need, therefore, for a protective covering device that is simple to use, easy to manufacture, effortless in its operation, and easy to handle by all generations. The present inventor has created a device that fulfills such need.

The present invention employs many features that overcome these aforementioned problems within the prior art. The present invention requires no modification to one's present vehicle, is a freestanding, independent device, and is capable of dimensional adjustment to accommodate a variety of vehicle shapes and sizes. This is particularly useful should the vehicle owner opt to upgrade his or her present vehicle. The adjustability of the present invention allows it to cover a new vehicle as easily as the previous vehicle, leaving the previous vehicle in an unaltered state for resale or trade.

An improvement of the present invention over existing devices is the self-contouring, non-ribbed cover itself. Because the cover is a single sheet of flexible material without unwieldy stiffening members, it is able to be withdrawn from the vehicle and stored within a minimum of space. The self contouring cover is also able to accommodate a variety of vehicle shapes, from standard sub-compacts to sport utility vehicles. Furthermore, the lack of stiffening members cuts out needless manufacturing steps for an otherwise simple structure. Simplicity contributes to the commercial viability of any product in the form of decreased manufacturing costs, which are passed along to the customer, and an increase in user satisfaction resulting from ease of use, storage and operation.

Indeed, perhaps the most unique and significant improvement of this invention over prior art is the storage of the flexible covering on a spring-loaded roller mechanism that is not, in any way, attached to the object to be covered. This mechanism allows the covering to be rapidly applied and rapidly withdrawn with minimal effort on the part of the user. Additionally, the cover, when retracted, is assisted by the spring-loaded mechanism, thereby making the uncovering of the object essentially effortless, while the roller completely eliminates the need for folding and for locating suitable storage. The roller assembly is also stored within a preferably self-cleaning protective housing that assists in removing debris from the outer surface of the cover and shields the stored cover from the natural elements. In addition, the cover itself is designed to be both gravity retained with respect to covering a vehicle, yet air decelerated when being placed over a vehicle so it does not merely drop over the vehicle onto the ground, but is gently conveyed thereover without the use of either separate or integral spring or other buffer or deceleration devices.

OBJECTS OF THE INVENTION

It is an object of the present invention, therefore, to provide a protective covering device that is easy to operate, simple in construction and requires a minimal amount of manufacturing.

It is a further object of the present invention to provide a protective covering device that is freestanding, independent of the object to be covered, and does not require any temporary or permanent modification to the object to be covered.

It is a still further object of the present invention to provide a protective covering device that is adjustable to cover a variety of objects with varying dimensions.

It is a still further object of the present invention to provide a protective covering device having a non-intrusive frame structure designed to accommodate situations with space constraints.

It is a still further object of the present invention to provide a protective covering device that utilizes a soft, self-contouring cover allowing for flexibility in covering vehicles of varying shapes and sizes.

It is a still further object of the present invention to provide a protective covering device having a protective cover of a one-piece, simple construction without the need for additional framing or stiffening members throughout the cover.

It is a still further object of the present invention to provide a protective covering device having a flexible covering that is stored and extracted from a spring-loaded roller housed within a protective enclosure, such roller not being connected or coupled to the object to be covered.

It is a still further object of the present invention to provide a protective covering device having a flexible, weather-resistant sheet capable of being drawn off the roller and over the object to be covered in a one-step, fluid motion.

It is a still further object of the present invention to provide a protective covering device having a flexible covering that may is removed from the covered object in an effortless fashion by a spring-assisted roller, such roller providing a storage location for the flexible covering and alleviating or eliminating the need for folding the flexible covering and storing it in an alternate location.

It is a still further object of the present invention to provide a protective covering device that is itself protected from the natural elements when stored and has additional means to remove surface debris collected on such flexible covering as such covering is being reeled onto the roller.

It is a still further object of the present invention to provide a protective covering taking advantage during deployment of an air deceleration of the cover as it settles over an object to be protected.

Still other objects and advantages of the invention will become clear upon review of the following detailed description in conjunction with the appended drawings.

SUMMARY OF THE INVENTION

A protective covering device comprises primarily a spring-loaded roller around which a weather-resistant, flexible material is wrapped for storage during periods of non-use. The flexible material is also of a preferably one-piece, durable fabric construction having means to self-contour about the object to be covered. The roller is housed within a protective enclosure shielding the roller and the flexible covering from the natural elements. The flexible covering is extended off the roller and over the object to be covered, with such cover being reeled back onto the roller in a spring-assisted fashion, thereby making the entire covering and uncovering operation essentially effortless. A pivoting arm member anchored to the ground may be implemented to assist in the extension and retraction of the flexible covering about the object to be covered. A further framing piece may also be implemented to further assist in the operation of the flexible covering, and also provide the optimum spacing between the arm member and the storage roller. The framing piece further centers the arm member approximately halfway between the storage roller and the end of the object to be covered, such that the arm member approximates an efficient 180° arc during the covering and uncovering strokes. Simple air buffered deceleration of the cover as it settles over the object to be covered is designed into the apparatus.

BRIEF DESCRIPTION OF THE DRAWINGS

FIG. 2 is a cross section of the protective housing of the invention taken through the side of the housing.

FIG. 3 is a top view of the leading edge of the covering of the invention showing a handle attached thereto.

FIG. 8 is a diagrammatic side view of the covering of the invention extended completely over an object.

FIG. 9 is a diagrammatic top view of a preferred embodiment of the device of the invention.

FIG. 16 is a diagrammatic view of one embodiment of the device of the present invention shown in its constituent parts packaged in a kit or the like.

DESCRIPTION OF THE PREFERRED EMBODIMENTS

Figure 1:
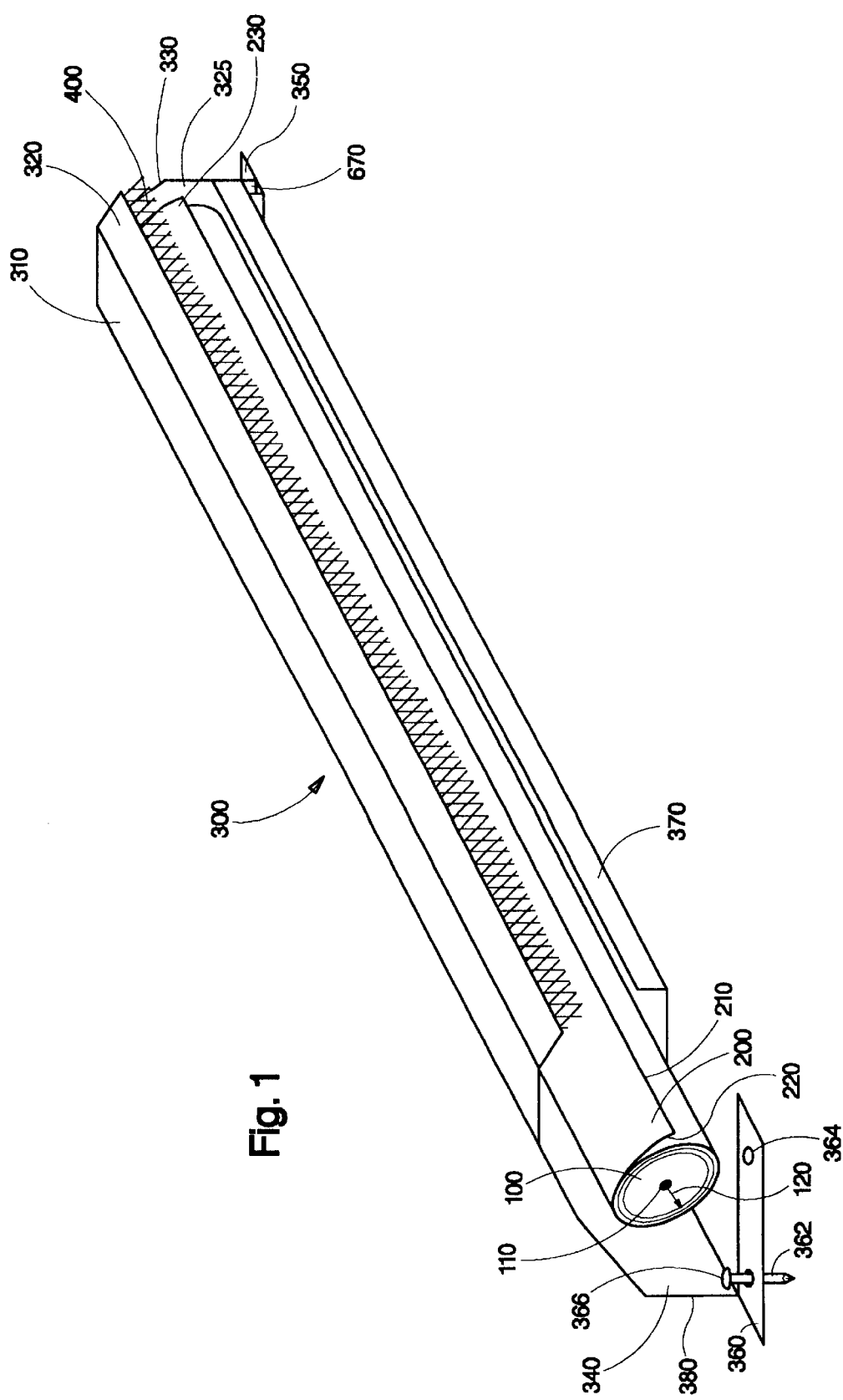
FIG. 1 is an isometric view of the protective housing of the device of the invention with a portion cut away to show the inside.

The protective covering device of the present invention is designed to be semi-portable, adjustable over a variety of object dimensions, and freestanding. It is swiftly and easily assembled, easily adjustable and effortless to operate. It should be noted that the protective covering device of the present invention may be used to cover a wide variety of objects, such as cars, motorcycles, bicycles, mini-vans, and the like. It may also be used to cover, for example, a pile of dirt, bricks, a garage sale table, a person reclining on the ground, or anything else imaginable. The preferred type of object is, however, a motor vehicle, and this will be used as the basis for all future examples. The applications for the device of the present invention, however, are in no way limited to the covering of motor vehicles and the like, but motor vehicles, and more specifically cars, will only be discussed for purposes of simplicity.

The foundation of the protective covering device of the present invention is the spring loaded roller which is mounted into a freestanding protective housing. Attached to the roller is a weather-resistant, flexible sheet of material, which is essentially drawn off the roller and over the object to be covered. For purposes of further discussion, the flexible sheet of material will be designated as a "covering."

This covering also preferably has the means to be self-contouring, whereby the covering, when extended over the object to be covered, fits nicely or snugly around such object, thereby creating a clean, tight appearance. This self-contouring feature is preferably accomplished by a cord strung though the sides of the covering by way of grommets or the like, which maintains the sides of the covering against the covered object.

The protective roller housing, when in use, is preferably located parallel to, for example, the front bumper of a vehicle, and is anchored to the ground using a variety of anchoring hardware depending on the type of surface to which it is mounted, such as, for example, cement nails or ground screws. A spacing and supporting frame preferably attaches to the roller housing, and preferably comprises a pivoting arm member that assists in the extension of the covering from the roller and over the object to be covered. The arm member also assists in the uncovering of the object and the return of the flexible covering onto the roller. Since the pivoting arm member guides the covering over the vehicle, and since vehicles come in all shapes and sizes, the device of the present invention incorporates an adjustable pivot point, such that the pivot point is preferably positioned at the midpoint of the object to be covered. The spacing and support frame both positions the pivot point of the arm member preferably near the center of the vehicle and supports the arm member alongside the object to be covered. This frame is adjustably positioned with respect to the protective roller housing, while the arm member attaches to the leading edge of the flexible covering.

A unique feature of the protective covering device of the present invention, which distinguishes it from the prior art, is a so-called "parachute" effect, realized by the temporary capture of air underneath the flexible covering as the covering is drawn over the vehicle. This parachute effect cushions the "landing" of the covering's leading edge on the ground at the rear of the vehicle. The leading edge of the flexible covering usually comprises a stiffening member, which allows a user to manipulate or work with the entire leading edge of the covering at the same time.

This stiffening member also weighs the covering down on the ground, enabling it to remain over the vehicle without any additional tie downs at the rear of the vehicle. As the leading edge of the flexible covering is extended over the midspan of the vehicle, which correlates to the highest point of the arc travel of the leading edge, the weight of the stiffening member tends to accelerate the resulting travel of the covering over the vehicle and to the ground. The parachute effect created by the capture of air cushions or air brakes the fall of the leading edge onto the ground, and essentially allows the operator of the device of the invention to let the covering glide to the ground. This parachute effect also prevents the leading edge of the covering, now with additional weight due to the stiffening member, from causing harm to body or personal property.

The device of the present invention also comprises a guidepost-like marker which extends from the top of the roller housing so as to guide the vehicle's owner when parking the vehicle for use of the vehicle cover. The guidepost will allow the driver to line up the center of his/her vehicle with the center of the vehicle cover. Said guidepost will be reflective in nature to facilitate use during night-time hours.

Another feature of the present invention is an automatic self-contouring tension system. This system is comprised of cords, or the like, and a series of grommets installed in the sides of the cover. As the covering is extended up and over the vehicle, the covering pulls along with it the cords, unspooling them from the roller and automatically increasing the tension as the covering extends farther from the stowed or stored position. The end result is that the cords slide through the grommets in the lower side portion of the covering, providing a downward pulling effect which contours the covering under tension around the sides of the vehicle.

A most desirable feature of the present invention, as described above, is the adjustability of the ground frame upon initial installation for various sized vehicles. This allows the frame, used in the application of the cover, to slide forward or backward on the ground, thereby enabling the user to locate the frame pivot point at or near the center of the vehicle. This adjustability provides for a tight fit for individual use as well as providing a generic size feature in order for the device to be used with a variety of vehicles.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

FIG. 1 is an isometric view of a protective housing 300 having a roller 100 with a flexible covering 200 attached thereto, such Figure shown with an edge portion of the housing 300 cut out to expose the interior of such housing 300. The protective housing 300 is preferably incorporated to store the roller 100 and covering 200 during periods of nonuse to prevent such roller 100 and covering 200 from being exposed to the natural elements, and is also used to protect the roller 100 and a portion of the covering 200 during periods of actual use. Of course, while the implementation of the protective housing 300 is preferred, it is not crucial to the operation of the device of the present invention, since the roller 100 and material 200 could be supported by other anchoring means and the like. The roller 100 has a center 110 fixed within the housing 300, and preferably between the side walls 330 and 340, shown on edge and partially cut away respectively, of the housing 300, and a radius defined as 120. Attached to the roller 100 is a flexible, preferably weather-resistant, covering 200 having a leading edge 210 and two side edges 220 and 230, with the fourth edge securely attached to the roller and hidden from view. The leading edge 210 also has a protective covering 212 to prevent the leading edge from marring or damaging any surface it might contact, including is the ground. This protective covering 212 can be in the form of a cushioning strip spanning between the ends of the leading edge 210, or it can be in the form of separate cushioning segments. The protective housing 300 generally has an upper surface 310 a slanted surface 320 and two sides 330 and 340, two base plates 350 and 360)one front plate 370 and one back face 380. The supporting plates 350 and 360 maintain the aprotective housing 300 flat, and orifices 362 and 364, for example, provide the means to anchor the housing 300 to a surface using any suitable anchoring means, shown for example, as anchoring member 366. There is also shown in FIG. 1 a brush or cleaning implement 400 attached to plate 320 which will be described in more detail in connection with FIG. 2.

FIG. 2 is a cross section of the protective housing 300 shown in FIG. 1, taken through the side 340 of the housing 300. An additional feature of the protective housing 300 are drainage holes 390 and 395 for example, positioned about the underside 315 of the housing 300 to allow for drainage of collected water from within the housing onto the ground surface. Directional arrows 130 illustrate the rotation of the roller 100 about its center 110 within the protective housing 300. Fastened within the leading edge 210 of the flexible sheet 200 is a stiffening member 240 which allows for easy grasping and manipulation of the leading edge 210 of the flexible sheet 200 by an operator of the device of the invention. The flexible sheet 200 is also comprised of a inner surface 250 and an outer surface 260, the inner surface 250 coming into contact with the object to be covered and the outer surface 260 being exposed to the natural elements. The outer surface 260 is preferably weather resistant and of a sufficient durability to withstand common elemental debris such as falling twigs, rain, snow, sleet and the like. The roller 100 of the invention is spring loaded shown diagrammatically in FIG. 2 by spring 140, with such spring 140 being a conventional, helical spring, i.e. it only winds in one direction. Consequently, as the covering 200 is drawn out of the protective enclosure 300 by manipulation of the leading edge 210, the roller 100 rotates in the direction of the arrows 130 thereby tightening the spring 140 thereby increasing the tension on the spring 140 as the material 200 is extended off the roll 100. As will be described, and as particularly shown in FIG. 2, a brush 400 engages the outer surface 260 of the flexible sheet 200 as such sheet 200 is withdrawn from and returned to the roll 100 within the protective housing or enclosure 300, and this brush 400 acts to sweep away any debris on the outer surface 260 of the sheet 200 that may have come to rest on the outer surface 260 as such is positioned over the object (not shown) to be covered. While the brush 400 shown in FIG. 2 is of the bristle-variety, any suitable cleaning implement may be used, such as a blade, a piece of stiff material, and extension of the plate 330 or the like. The gap 375 within the protective housing leaves open the possibility for rain and other matter to settle within the floor 305 of the protective housing and the drainage orifices, shown as 390 and 395 for example, act to alleviate any settling of rain or the like on the floor of the protective housing. Access to the inside 308 of the protective housing 300 to remove larger debris can be accomplished through the opening 375, or by having a pivoted or removable front plate 370a, shown diagrammatically in phantom. Also shown in FIG. 2 is a guidepost-like marker 700 which could extend from the top of the housing 310 so as, for example, to guide the vehicle's owner when parking the vehicle for use of the covering device of the invention. The guidepost 700 will allow the driver to line up the center of his/her vehicle with the center of the housing. Said guidepost 700 should also be reflective to facilitate use during night-time hours. Such marker 700, which may be fixedly or removably attached to the housing 300, is obviously not necessary for the proper covering operation of the device of the invention, and it merely enhances the use of the device of the invention during normal conditions and conditions of poor visibility. It also assists the operator of the object to be covered to center such object in synch with the center of the housing 300.

Figure 2A:
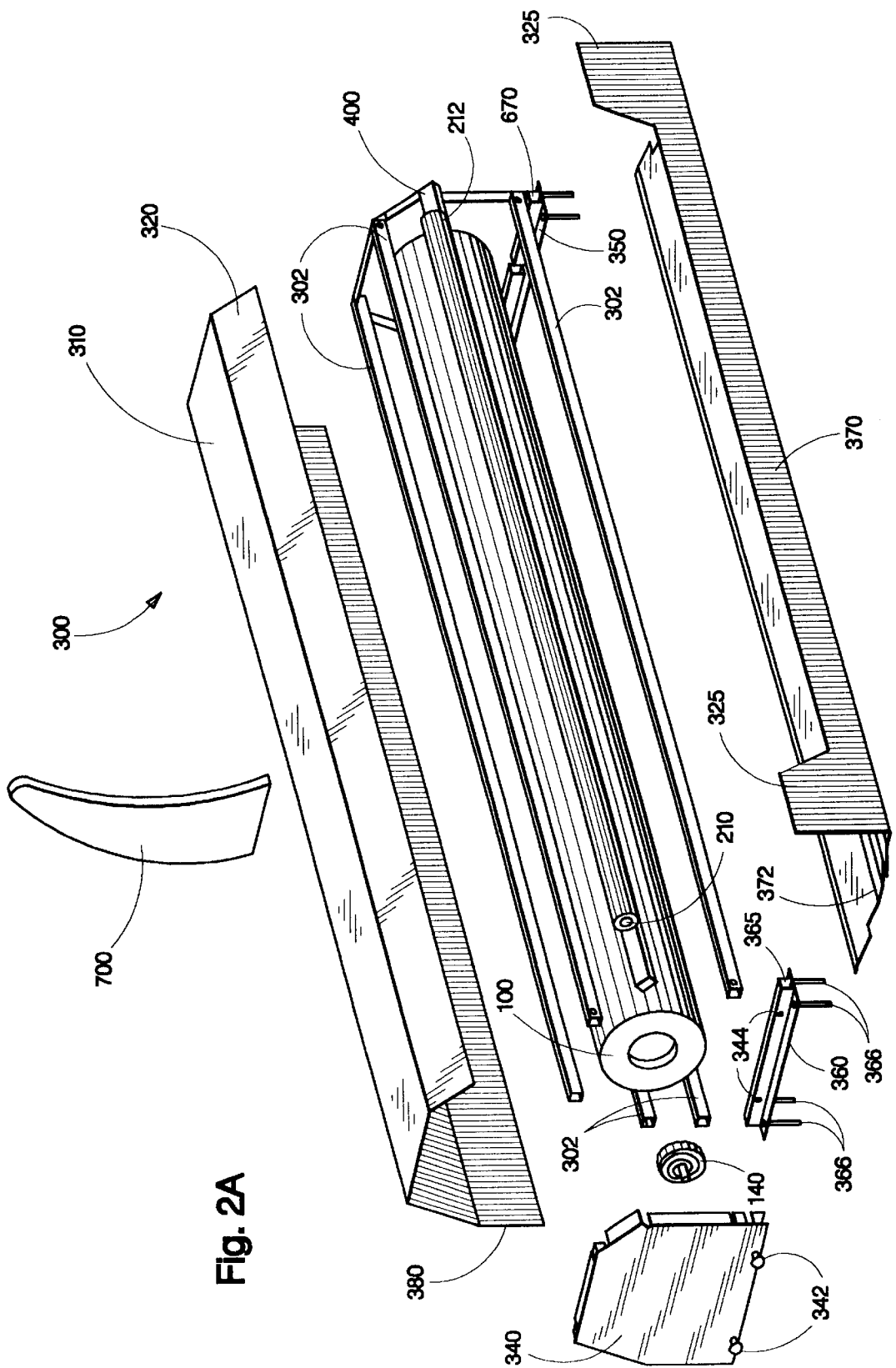
FIG. 2A is broken apart view of FIG. 2.

FIG. 2A is broken apart view of the roller housing 300 shown previously in FIG. 2. The internal frame of the housing 300 is constructed from framing pieces 302. The marker 700 is shown as a distinct unit positioned along the center of the top plate 310 for possible alignment with a hood ornament or the like, however, it could also, if desired, extend along the entire top plate 310 for alignment of the entire front of the vehicle, or is could also be situated along the top plate 310 as several distinct markers 700 for several alignment points. The front plate 370 is shown extended underneath the roller 100 and is pitched downwardly at the lowermost point 372 to further assist in the drainage of water and the like onto the ground. Generally, the entire housing 300 and support or anchoring plates 350 and 360 are transportable as a unit. However, as noted in FIG. 2A, clevis pins 342 located on both side plates 330 and 340 (only 340 being shown) enable the entire housing 300 to be removed from the plates 350 and 360 via orifices 344 located along the support plates 350 and 360. Once the housing 300 is removed from the support plates 360 and 350, the front plate 370 can be removed to access the interior 308 of the housing for removal, replacement and/or cleaning of the roller 100 and the like. In addition, an alternative housing (not shown) having, for example, a roller of covering to accommodate larger-sized objects can be attached to the existing support plates 350 and 360 to create a protective covering device to accommodate shorter or longer objects or the like.

FIG. 3 is a diagrammatic top view of the leading edge 210 of the covering 200 with the stiffening member 240 shown in phantom. A handle member 400, having a connecting member 410 and a grasping section 420, could be coupled to the leading edge 210 via the stiffening member 240, with the connecting member 410 being short as shown, or somewhat longer designated 400a in phantom. The operator could manipulate the leading edge 210 of the flexible covering 200 using the handle 400 or 400a, thereby providing a means to extend the covering 200 over the object to be covered (not shown) and vice versa.

Figure 4:
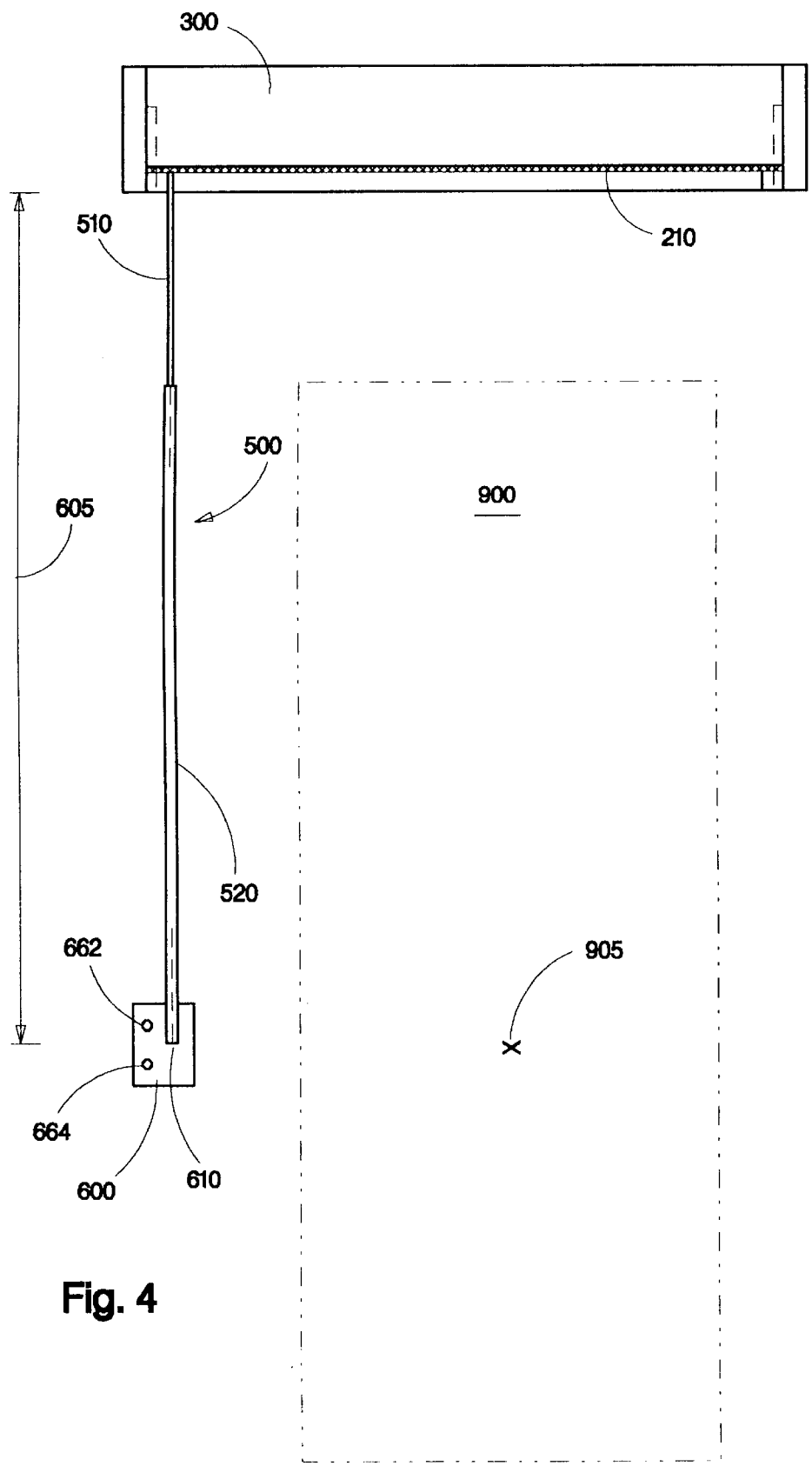
FIG. 4 is a diagrammatic top view of one embodiment of the invention showing the device of the invention positioned near an object to be covered.

FIG. 4 is a diagrammatic top view of a more preferred arrangement, further comprising an adjustable arm member 500 pivotable on a plate 600, such pivoting accomplished through a suitable pivot connection known in the art. The adjustable arm member is generally comprised of two sections, a first section 510 connected to the leading edge 210 of the flexible covering 200 and a second section 520 connected to the pivot plate 600. The first section 510 of the arm member 500 is telescopically positioned within the second section 520, although the second section 520, if desired, may be telescopically positioned with the first member 510. The adjustability of the arm member 500 allows for adjusting the distance 605 between the plate 600 and the protective housing 300, thereby enabling the operator to center the pivot point 610 at or near the longitudinal center 905 of the object to be covered 900. To prevent the arm member 500 from going through continuous adjustments as the arm member 500 is used to extend the covering 200 from the housing 300, the pivot point is fixed by securing the plate 600 to the ground via suitable anchoring means through, for example, orifices 662 and 664. Of course, the plate 600 should not be permanently anchored, but merely securely anchored, so that the adjustments can be made as necessary to accommodate objects 900 of different sizes.

Figure 5:
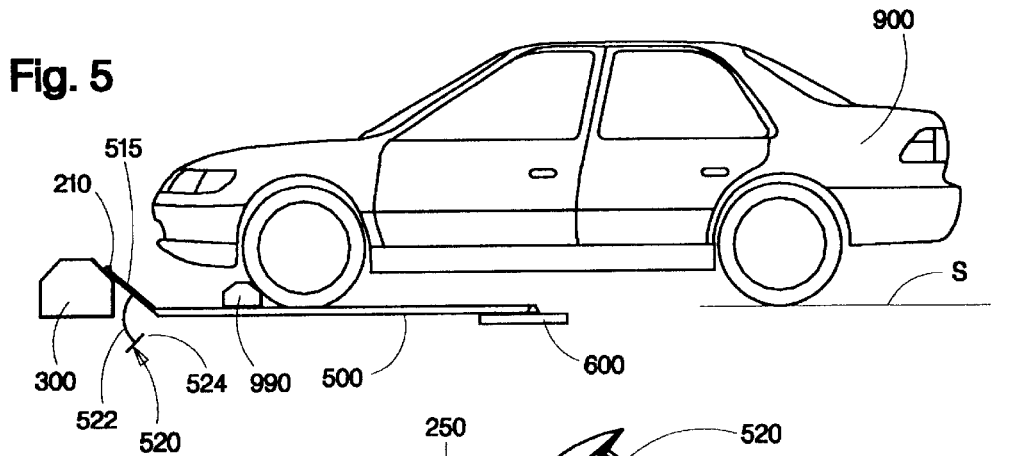
FIG. 5 is a diagrammatic side view of an object to be covered with the device of the invention positioned along the side thereon.

FIG. 5 is a diagrammatic side view of an object to be covered, here a vehicle 900, positioned on a surface S against a parking space block or barrier 990 of the conventional cement variety. The adjustable arm 500 is connected to the leading edge 210 of the flexible covering (not shown), while the plate 600 is positioned and preferably anchored along the side, and at or near the longitudinal center of the vehicle, as previously described in connection with FIG. 4. The end 515 of the arm member 500 that attaches to the leading edge 210 is slanted somewhat so that the majority of the arm member 500 is able to lie flat against the surface S. A handle of the type described in FIG. 3 may be attached to the leading edge as shown in FIG. 3, or a handle 520 as shown in FIG. 5 may extend either from the leading edge (such embodiment not shown here) or from the slanted section 515 of the arm member 500. Such handle 520 enables an operator to easily extend the flexible covering (not shown here) over the object 900. The handle may also dangle from the arm member 500 when not in use, or may be stored within the arm member in a suitable storage slot or using a suitable storage connection (both not shown) Of course, if the operator (not shown) did not wish to use the handle 520 provided, the operator could also easily manipulate any portion of the arm member 500 to effect the same covering and uncovering operation.

Figure 6:
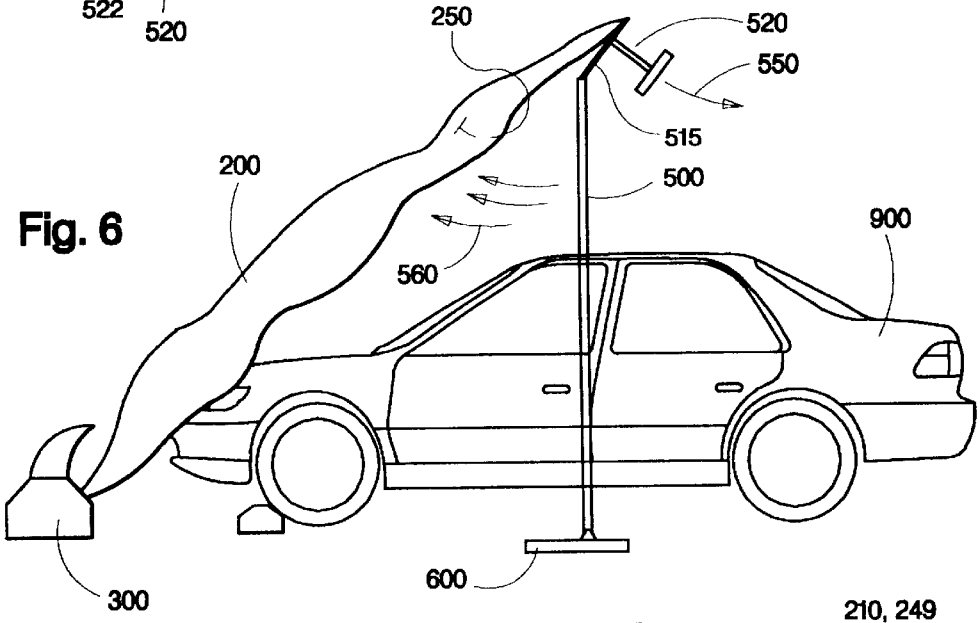
FIG. 6 is a diagrammatic side view of the device of the invention extended partially over the object to be covered.

FIG. 6 is a diagrammatic side view of the arm member 500 positioned directly above the vehicle 900 with the flexible covering 200 partially withdrawn from the housing 300. By grasping the handle 520 and exerting a force 500 on such handle, the operator is able to extend the flexible covering 200 easily from the housing 300 and over the object 900 in a simple arc motion assisted by the pivoting of the arm member 500 on the plate 600. In general, having the arm 500 pivoted on the plate 600 is more effective than merely having a handle attached to the leading edge as shown and described in FIG. 3.

Figure 7:
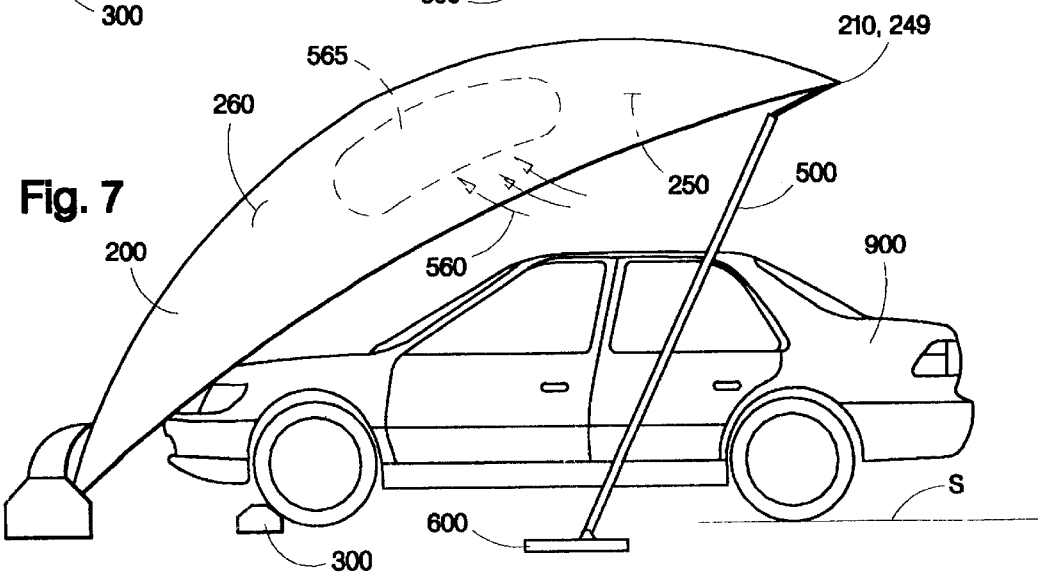
FIG. 7 is a diagrammatic side view of the covering of the invention extended substantially over an object.

As now shown in FIG. 7, as the arm 500 is extended clockwise beyond its midpoint, the flexible covering 200 begins to accumulate air, designated by arrows 560, and a resultant air pocket, designated 565 in phantom, along the inner surface 250 of the covering 200. This air 560 and air pocket 565 tends to create a "parachute effect" whereby the flexible covering is ballooned outward in the direction of arrow 570. This parachute effect creates an air resistance to the continued clockwise movement of the arm member 500 and the eventual laying of the flexible covering 200 on the object 900. This parachute feature allows the operator to reduce the force exerted upon the arm member 500 once the arm member 500 has passed the midpoint of its pivoting arc. Past this midpoint, the arm member will essentially complete its arc by the gravitational pull on the arm member 500 and on the stiffening member 240 within the flexible covering leading edge 210, and come to rest on the ground S as shown in FIG. 8. The air pocket 565 and this parachute effect allows the arm member to glide downwardly to the ground, and not slam to the ground with the potential for injury to the operator's body and personal property.

FIG. 8 is a diagrammatic side view of an object 900 covered with the flexible covering. Grommets 290 may be situated near the side edges 220 and 230 (only 220 being shown here) through which a flexible or elastic-type cord 295 or the like could be strung, such cord 295 extending between the roller 100 and the leading edge 210 of the flexible covering 200. A more preferable system would also include a somewhat non-elastic cord 297, whereby as the arm member 500 is moved up and over the vehicle or object 900, thereby pulling the covering 200 with it, the covering 200 pulls along with it the somewhat non-elastic 297 and elastic 295 cords, unspooling them from the roller 100 and automatically increasing the tension on the elastic cord 295 as the covering 200 extends farther from the stowed position. The end result is that the cords 297 and 295 respectively slide through the grommets 290 in the lower side portion of the covering 200, providing a downward pulling effect which contours the covering 200 under tension around the sides of the vehicle or object. The somewhat non-elastic cord 297 prevents the sides of the covering 200 from bunching up under the increased tension of the elastic cord 295, and maintains the covering 200 firmly against the sides of the vehicle or object 900. Of course, the sides of the covering that would contact the sides of the vehicle or object should be protected such as to not mar or damage the surface of the vehicle or object. During high wind conditions, suitable fastening means 299 may be used to fasten the sides of the flexible covering, through the grommets 290, to the plate 600 or the arm members 500, thereby securing the covering 200 about the object 900. In addition, the outer surface 260 of the covering 200 could be adorned with surface ornamentation 202 of a variety of designs and configurations.

Figure 10:
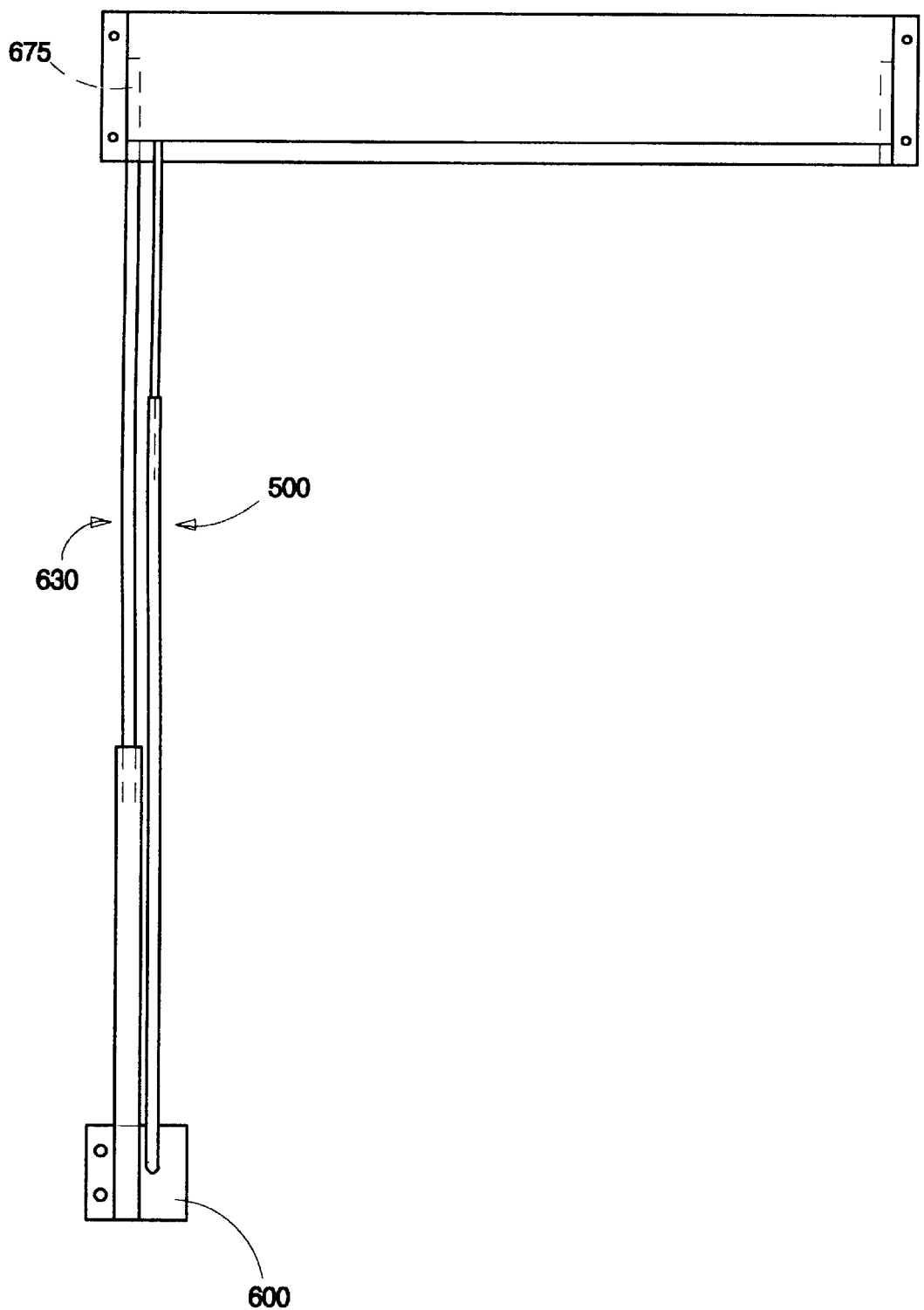
FIG. 10 is a diagrammatic top view of an alternative embodiment of the device of the invention.
Figure 11:
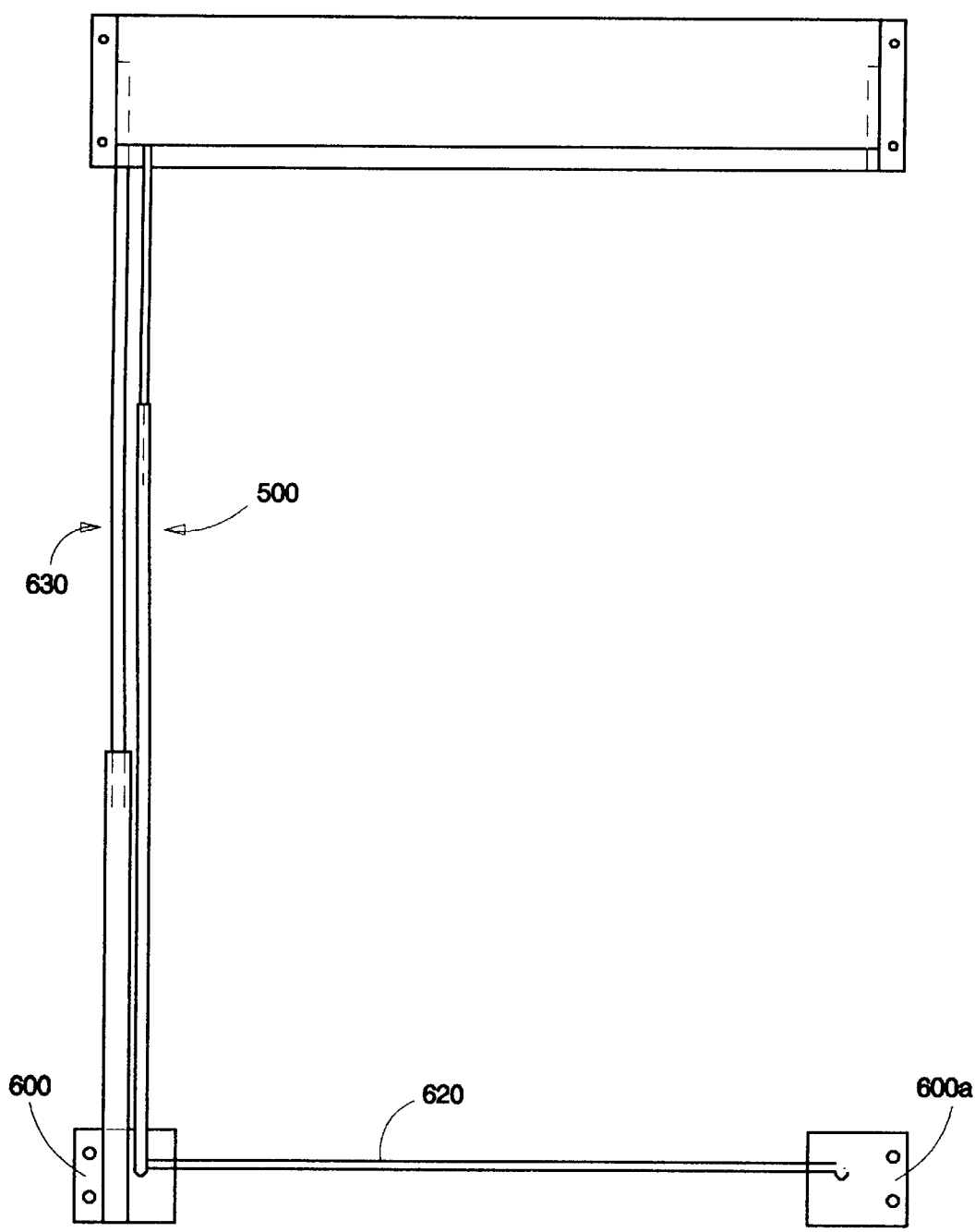
FIG. 11 is a diagrammatic top view of a further alternative embodiment of the device of the invention.
Figure 12:
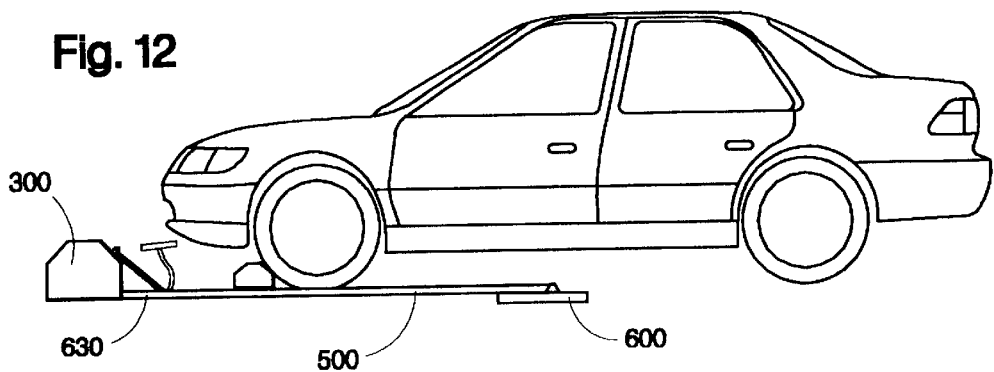
FIGS. 12 through 14 show an operation of the device of the present invention, similar to FIGS. 5, 6 and 8, but with the preferred embodiment of the invention shown in FIG. 9.
Figure 13:
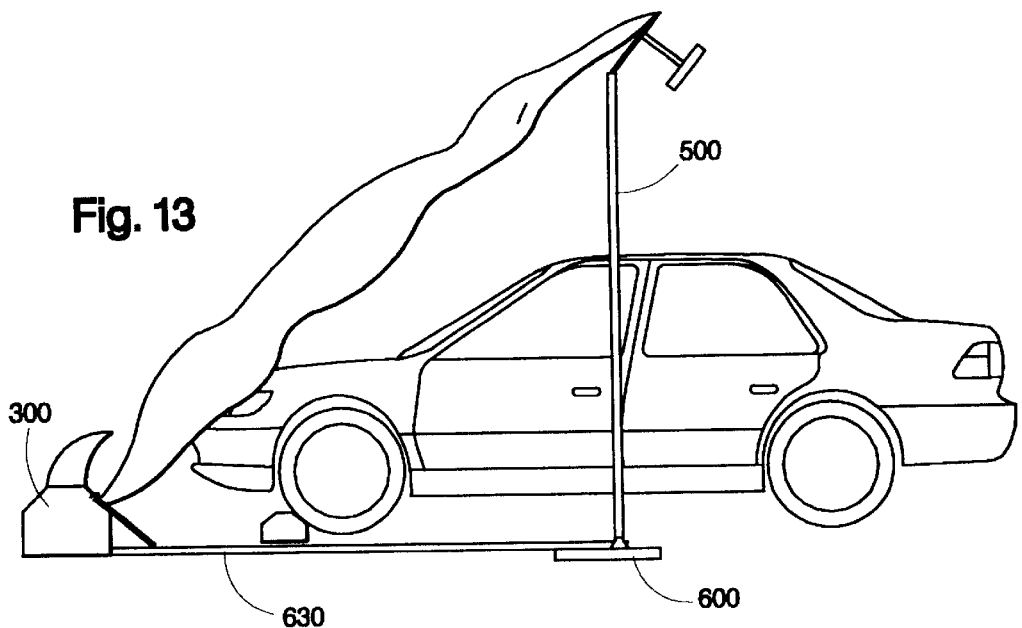
Figure 14:
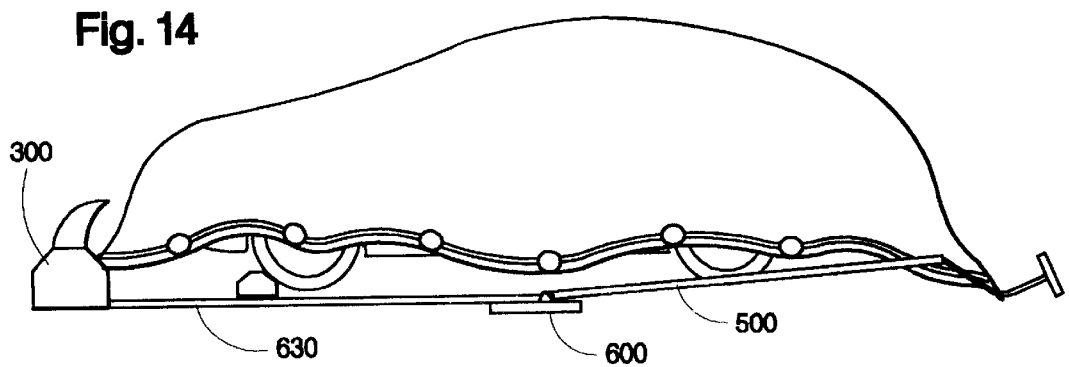
Figure 15:
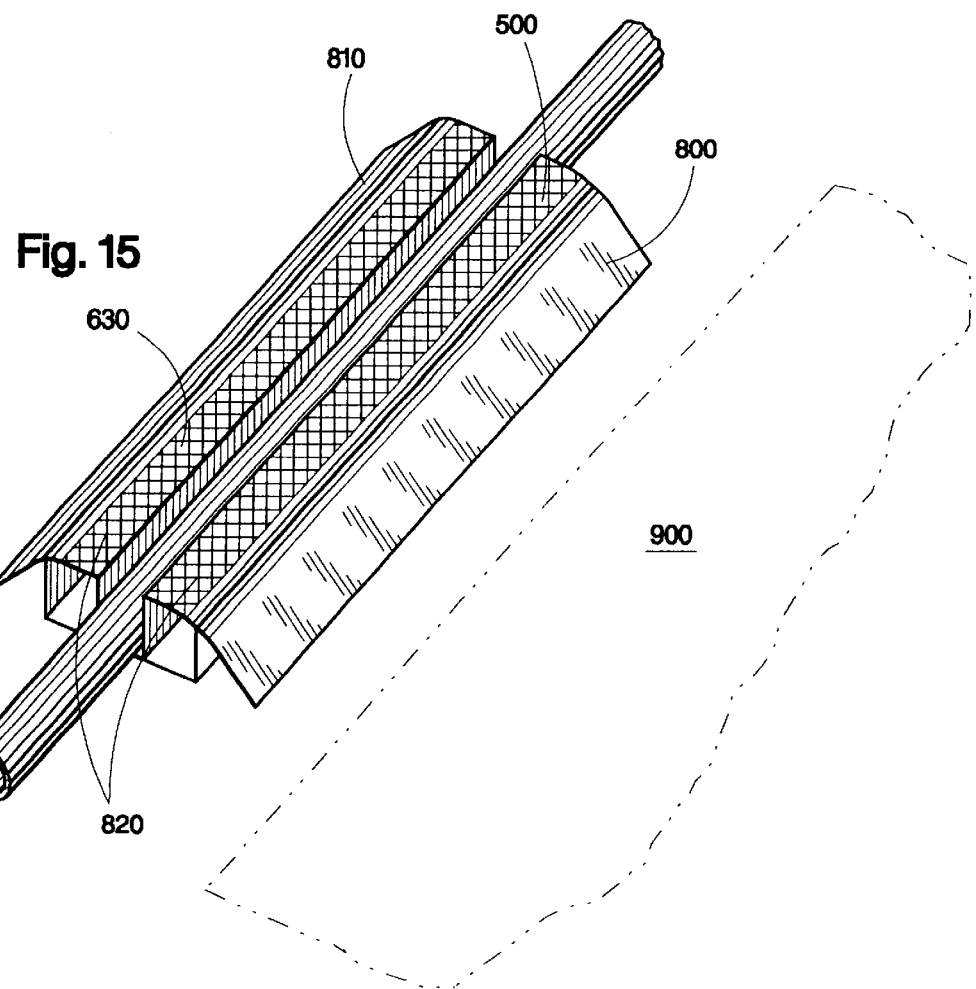
FIG. 15 is a diagrammatic view of ramp-like safety devices incorporated onto the device of the present invention.

FIG. 9 is a diagrammatic top view of a preferred embodiment of the device of the present invention. The preferred embodiment includes two arm members 500 and 500a, each connected at opposite ends 210 and 210a of the leading edge 210 of the flexible covering 200, and two adjustable spacing or framing members 630 and 630. As with the arm members 500 and 500a, which comprise a pair of telescopically adjustable sections 510, 510a and 520, 520a, the spacing members 630 and 630a also each comprise a pair of telescopically adjustable section 634, 634a and 638, 638a as shown. A cross member 620 spans between two anchor plates 600 and 600a, such cross member 620 being of sufficient durability to withstand the weight of a car, for example, that might drive over it in position to be covered. When the spacing members 630 and 630a are connected to the housing 300 through chambers 670 and 675 shown in phantom (see also FIG. 1 illustrating chamber 670), and when the plates 600 and 600a are anchored to the ground, the entire structure becomes very stable. Having a framing or spacing member 630 an 630a for example, on each side of the housing 300 would allow an operator to manipulate either arm member 500 or 500a to be able to cover an object from either side of the object. Of course, the stability of the device of the present invention described in connection with FIGS. 4 through 8 could be increased by adding a spacing or framing member as shown in FIG. 10, or even more so by further adding a cross member as shown in FIG. 11, and each of these embodiments would also be sufficiently operable to cover and uncover an object. The embodiment shown in FIG. 9 is preferred to the others from a structural standpoint because the entire assembly is both supported at all corners C1 through C4 by suitable anchoring means on the plates 350 and 360 on the housing 300, and the plates 600 and 600a between the cross member 620, and is supported by the interconnection of the arm 500, 500a and spacing 630, 630a members with the housing 300 and between the cross member 620. FIGS. 12 through 14 illustrate the operation of the device of the invention shown in FIG. 9, and are essentially identical to FIGS. 5, 6 and 8, but with the addition of the spacing or framing member 630 (and 630a, not shown) shown between the plate 600 and the housing 300.

The operation of the device of the invention will be explained with reference to the most preferred embodiment described in FIG. 9. In order to operate the device of the invention, the housing 300 must first be positioned and anchored along one end of an object to be covered. Usually, the housing 300 is positioned at the head of a parking space, and if there is a cement block 990 (see, for example, FIG. 5), then beyond such block 990. The first section of the spacing or frame members 634 and 634a are then inserted into the chambers 670 and 675 within the housing 300, and such first sections 634 and 634a are then telescopically inserted into the second sections 638 and 638a of the spacing or framing members, which second sections 638 and 638a are already attached to the anchoring plates 600 and 600a. The arm members 500 and 500a are also connected to the leading edge 210, and preferably the stiffening member 240, by suitable secure connections, and such arm members 500 and 500a are also connected to the plates 600, 600a or the spacing members 630, 630a. The cross member 620 extends between the two arm members 500 and 500a, which are all pivotally connected by a suitable pivotable connection to either the plates 600, 600a or the framing members 630, 630a. The connection between the cross member 620 and plates 600, 600a and arm members 500, 500a can be accomplished in a variety of ways, just as long as the pivot point of the arm members 500, 500a is at or near the plates 600, 600a. For example, the arms could actually pivot on the spacing or framing members 630, 630a as the case may be. The cross member 620 and plates 600, 600a are then positioned away from the housing 300 at the approximate longitudinal center of the object to be covered. If the object were a car, then the cross member 620 and plates 600, 600a could initially be positioned at an estimated distance, and then varied once the car is driven over the cross member and parked in position to be covered. Of course, the variation in spacing of the spacing or framing members 630, 630a results in an equivalent variation in the spacing of the arm members 500, 500a between the leading edge 210 and the plates 600, 600a. Once the spacing is determined, the plates 600, 600a are finally anchored to the ground.

The operator of the device then, for example, drives his or her (his will be used from here on out) car over the cross member and parks, with the center of the car positioned directly over the cross member 620. If the operator is using a market 700, see FIG. 2, then such operator would also transversely center his car in the parking spot in relation to the housing. The operator then exits from his vehicle and steps over the spacing or framing member 630 and the arm member 500, each of which are positioned along the ground. Due to the potential for trippage at this particular location, a ramp 800 could be placed along the edge of the arm member 500 closest to the object 900 to be covered. Similarly, a ramp 810 could also be placed along the edge of the spacing or framing member 630 away from the object 900. The ramp 800 would be useful, for example, when an operator exits his vehicle and must step over the arm and framing members, while the ramp 810 would be useful when the operator is entering his vehicle. In addition, since the framing part of the device of the present invention could pose a potential tripping hazard, the surfaces of the framing members could contain warning indicia 820, such as a bright color, a "CAUTION" sign, striped tape or the like, to alert potential passerbys, particularly when the parking space is vacant, i.e. unoccupied by the object to be covered.

After the operator exits his vehicle and steps over the frame and arm members, the operator merely grasps the handle attached to the arm members and extends the covering 200 over the vehicle in a swift, arcuate motion (see FIGS. 12 through 14). During the initial stages of the extension of the covering from the housing, see FIGS. 12 and 13, the operator must exert a force to bring the arm member to a position generally perpendicular to the ground, i.e. midpoint along its arcuate path. Once the operator has exceeded this point, the operator merely has to guide the arm member the rest of the way to the ground, see FIG. 14, with the amount of force required being substantially less due to the forces of gravity and the "parachute effect" described in connection with FIG. 7. The parachute effect shown and described in FIG. 7 would also occur with the most preferred embodiment of the invention shown in FIG. 9. The leading edge remains at rest on the ground, aided by the additional weight provided by the stiffening member 240, until it is lifted during the uncovering operation. Furthermore, the protective covering 212 around the leading edge (see FIG. 2) prevents the leading edge, weighted down by the stiffening member, from injuring someone positioned in its path, or damaging a vehicle positioned in its path, such as if the owner of the device failed to correctly positioned the pivot point along the longitudinal center of the vehicle resulting in the leading edge contacting the rear of the vehicle instead of the ground. During the covering operation, rotation of the spring-loaded roller increases the tension on the spring within the roller, and the extension of the flexible and rigid cords through the grommets along the sides of the cover contour the sides of the cover to the sides of the vehicle, with the flexible, bungee-type cords also undergoing an increase in tension. The covering operation takes a couple of seconds at the most.

During the uncovering operation, the leading edge is lifted off the ground and the flexible covering reels back onto the roller under the tension of both the spring inside the roller and the flexible cord extended along the sides of the flexible covering. Consequently, the tension in the spring-loaded roller and the flexible cord make the uncovering operation easier than the covering operation, and the operator merely has to guide the flexible covering back into the housing. As the flexible covering is reeled back onto the roller, the brush 400 removes any debris that has collected on the outer surface of the flexible covering, and covers 325 (see FIGS. 1) located on either side of the opening 375 of the housing 300, prevents the flexible covering from bunching up on either end of the roller. The flexible covering is additionally contoured so that the flexible covering is slightly narrower at the leading edge to further prevent such reeling and unreeling operations from creating a bunching situation or effect at either end of the roller 100. The entire uncovering operations also takes a couple of seconds at the most, and once the flexible material is reeled back onto the roller, the operator merely has to drive away without worrying about cleaning, folding or storing the cover. Furthermore, the cover is ready to use again immediately after it is rolled up. During rainy conditions, excess rainwater that collects on the outer surface of the covering is either brushed away as the covering is reeled onto the roller, or is captured within the covering on the roller. Water that gathers in the housing is drained through the floor of the housing, and the roller sealed such that water is unable to penetrate the interior of the roller and effect the spring mechanism therein. Furthermore, all rotatable connections inside the housing are preferably rustproof and weather resistant.

The device of the present invention is designed to accommodate a variety of objects, vehicles and the like. Consequently, the dimensions of the spacing members and arm members should also accommodate a wide variety of covered objects. To accommodate larger vehicles such as vans, trucks and the like, larger spacing members could be used, with, of course, rollers having a longer amount of flexible material stored thereon. The spacing and arm members could also be provided with extension means to extend the length of the original arm and spacing members. Of course, the spacing and arm members do not have to be telescopically adjustable, but can be fixed or adjustable in a different fashion. The rollers could also be removable and interchangeable with rollers having different lengths of flexible material stored thereon to accommodate a wider variety of storage situations. The rollers could also be positioned in succession, for example, along a row or series of parking slots to accommodate a grouping or series of objects. Furthermore, while the aforementioned protective covering device is described as being purely manual in operation, the entire device could be mechanized and made purely automatic, suitable for the elderly and/or physically challenged and the like.

One of the unique features of the device of the present invention is the creation of the appearance of a rhinoceros, as seen more particularly in FIG. 8. The marker 700 assumes the shape of a rhino horn, the covering 200 over the vehicle creates the appearance of a body, while a dangling handle creates the appearance of a tail. The entire appearance is also streamlined to an extent, which is desirable during windy conditions, and if the situation arises, the sides of the covering may be fastened to the framing structure, with such fasteners being either removable or lockable depending on the nature of the surroundings. The rhino appearance also creates market appeal, and distinguishes the covering device of the present invention from all others that are rather bland, cold and mechanical in appearance.

Figure 16:
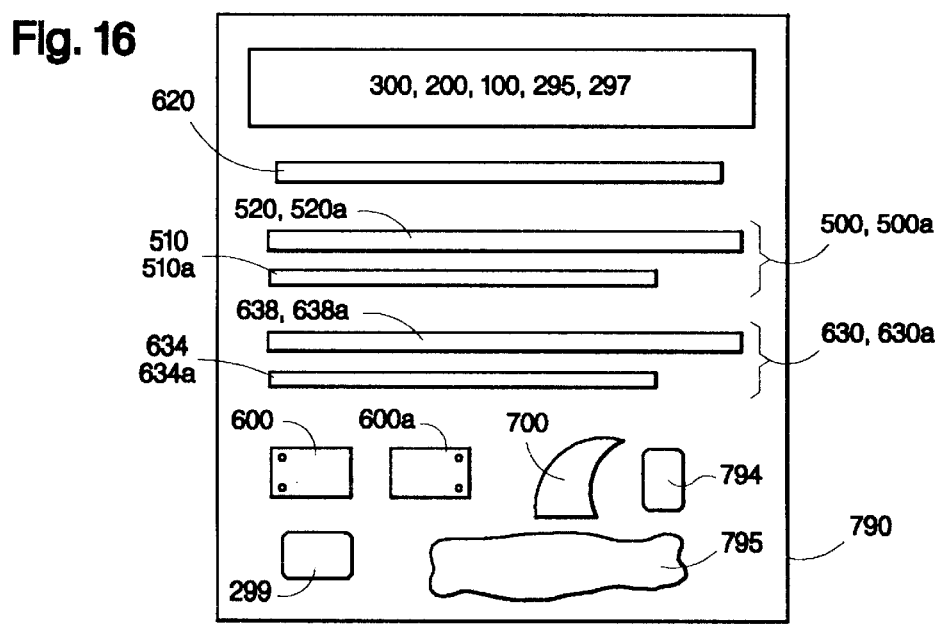

Another most desirable feature of the present invention is the ability to adjust and re-adjust pivot point of the arm member(s), and/or the framing member(s), upon initial installation for various sized vehicles. This adjustability, as discussed above, results from the telescoping-type arm and framing members, which slide within each other and are easily assembled and disassembled. In addition, the cross member and support plates are also relatively compact, and since such cross member is about the same length as the protective housing, the entire device of the present invention can easily be packaged in a kit or the like, with written, audio and/or visual instructions packaged therewith. FIG. 16 illustrates one possible embodiment of a kit or package 790 comprising, for example, a housing 300, in which is stored the roller 100 and covering 200 with or without cords 295 and 297, a cross member 620, one or two arm members 500 and/or 500a, each comprised of a first and second section 510 and/or 510a and 520 and/or 520a, one or two spacing or framing members 630 and/or 630a, each comprised of a first and second section 634 and/or 634a and 638 and/or 638a, one or two support plates 600 and/or 600a, a reflective marker 700, fastening members 299, and instructions 795 of the written, audio and/or video variety. For vehicles having fixed, vertical antennas, an adapter 794 may also be included in the package 790, which enables the user to modify the alignment of the existing antenna at an angle so that the antenna does not interfere with the proper operation of the protective covering device of the invention. The compactness of all the constituent elements of the device of the present invention enables one to swiftly install, adjust, re-adjust, and transport the protective covering if necessary.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A protective covering device for covering a physical object positioned on a planar surface comprising:
    a. a weather resistant, flexible sheet material of suitable dimension to cover a physical object, the flexible material having a leading edge, an inner surface adapted to face the object to be covered and an outer surface adapted to face away from the object to be covered,
    b. a reverse rotation biased roller adapted for positioning adjacent a location of the physical object to be covered and upon which the flexible material is stored,
    c. means to progressively extend a portion of the flexible material from a stored position upon the roller to intermediate positions, including partially covering the object, to a substantially fully covered position,
    d. shaping means positioned along the side edges of the weather resistant sheet material,
    e. the flexible sheet material and shaping means along the side edges of the sheet material being of a suitable, composition and form and the reverse bias of the roller as well as the trajectory of the means to progressively extend a portion of the flexible material being such that the force required to extend the flexible material from the stored position on the roller to the intermediate positions at least partially off the roller is greater than the force required to extend the flexible material from the intermediate positions to the covered position of the obiect as a result of air captured under the inner surface of the flexible material during the extension of the flexible material from the intermediate positions to the covered position, such air creating a parachute-like effect upon the flexible material.

2. A protective covering device in accordance with claim 1 wherein the reverse rotation biased roller further comprises a spring bias that enables the return of the flexible material from the covered position to the stored position with a force less than that required to extend the flexible material from the stored position to the covered position.

3. A protective covering device in accordance with claim 2 further comprising a protective housing in which the reverse biased roller is mounted.

4. A protective covering device in accordance with claim 3 wherein the means to progressively extend the flexible material means, further comprises handle means attached to the leading edge of the flexible material for manipulation by a human user.

5. A protective covering device in accordance with claim 4 wherein the handle means further comprises a pivot assembly, such pivot assembly further comprising an adjustable arm member attached to the handle means and a cross member positionable under the object to be covered and positioned substantially parallel to the protective housing.

6. A protective cover device in accordance with claim 5 wherein the shaping means along the side of the sheet material comprises flexible cord means along the side of the sheet and adjustably secured to such sheet.

7. A protective cover device in accordance with claim 6 wherein the cord means is at least partially resilient.

8. a protective cover device in accordance with claim 6 wherein the cord means is in the form of separate resilient and non-resilient cords.

9. A self-contouring protective covering device for covering an object resting on a planar surface comprising:
    a. a spring-loaded roller contained within a stationary housing secured to a planar surface, b. a sheet of flexible, weather resistant material fastened to the roller, the flexible material having a leading edge, two side edges, an inner surface facing an object to be covered and an outer surface facing away from the object to be covered, c. an adjustable frame assembly comprising a cross member, at least one adjustable spacing member connecting the cross member to the housing and at least one adjustable arm member connecting the cross member to the flexible material, d. the flexible material having edge tensioning cords along the two side edges extending between the roller and the leading edge, and e. a handle member positioned near an end of the arm member opposite the cross member to enable a user to extend a portion of the flexible material off the roller and over the object to be covered, and to initiate the spring-assisted return of the flexible material onto the roller.

10. A self-contouring protective covering device in accordance with claim 9 wherein the housing assembly further comprises means for guiding the flexible material out of and into the housing assembly.

11. A self-contouring protective covering device in accordance with claim 10 wherein the cross member is positioned under the object to be covered and at approximately one-half the length of the object to be covered.

12. A self-contouring protective covering device in accordance with claim 11 wherein the arm member further comprises a storage section for storing the handle member during periods of non-use.

13. A self-contouring protective covering device in accordance with claim 12 further comprising a reflective member for assisting in the location of the device during periods of darkness.

14. A kit containing a protective covering device for covering an object resting on a planar surface comprising:

a. a sheet of flexible material fastened about a spring-loaded roller contained within a protective housing, b. an adjustable frame assembly comprising a cross member, at least one length-adjustable spacing member, and at least one pivotable, length-adjustable arm member, c. a handle member attachable to the arm member, d. anchoring members for anchoring the protective housing and the cross member to a planar surface, and e. at least one set of written instructions for operating the protective covering device.

15. A kit in accordance with claim 14 further comprising a reflective member for assisting in the location of the protective housing during periods of darkness.

16. A kit in accordance with claim 15 further comprising edge tensioning cords attachable to the flexible material to enable the protective covering device to be self-contouring about the object that is covered.

17. A kit in accordance with claim 16 further comprising fastening members for fastening the flexible material to the frame assembly when the flexible material is covering the object.

18. A kit in accordance with claim 17 further comprising an adapter enabling the modification of the alignment of an antenna so that the antenna does not interfere with the proper operation of the protective covering device.

19. A protective covering device for covering an object resting on a planar surface comprising:

a. a weather resistant, flexible sheet material of suitable dimensions to cover an object to be covered, the flexible material having a leading edge, an inner surface facing the object to be covered and an outer surface facing away from the object to be covered, b. a roller positioned near the object to be covered and upon which the flexible material is stored, c. means to progressively extend a portion of the flexible material from a stored position to intermediate positions, partially covering the object to be covered, to a covered position, substantially covering such object to be covered, d. the flexible material being of a suitable substance such that the force required to extend the flexible material from the stored position to intermediate positions is greater than the force required to extend the flexible material from the intermediate positions to the covered position as a result of air captured about the inner surface of the flexible material during the extension of the flexible material from the intermediate positions to the covered position, such air creating a parachute-like effect upon the flexible material, e. wherein the roller further comprises as a part thereof a spring that enables the return of the flexible material from the covered position to the stored position with a force less than that required to extend the flexible material from the stored position to the covered position, f. further including a protective housing in which the roller is secured, g. wherein the extension means further comprise handle means attached to the leading edge of the flexible material for manipulation by a human user, and h. further comprising a pivot assembly, such pivot assembly further comprising an adjustable arm member attached to the handle means and a cross member positionable under the object to be covered and positioned substantially parallel to the protective housing.

20. A protective covering device in accordance with claim 19 further comprising at least one spacing member adjustably connected between the pivot assembly and the protective housing to maintain the pivot assembly at a distance from the protective housing preferably equal to approximately one-half the length of the object to be covered.

21. A protective covering device in accordance with claim 20 wherein the flexible material further comprises tension means to maintain flexible material in close proximity to the object to be covered when the flexible material is disposed in the covered position.

22. A protective covering device in accordance with claim 20 wherein the protective housing further comprises contact means to clean the outer surface of the flexible material as the flexible material is returned to the roller.

23. A protective covering device in accordance with claim 22 further comprising a gripping member attached to the arm member for positioning of the arm member away from the leading edge of the flexible material.

24. A protective covering device in accordance with claim 23 wherein the protective housing is removable from the supporting surface and interchangeable with other housings provided with other roller assemble arrangements.

25. A self-unfolding cover for protecting objects upon a surface from the surrounding environment comprising:

a. a flexible cover having a shape and dimensions to fit over an object to be protected resting upon a surface with the top of the cover adjacent the top of the object and the lower edges of the cover surrounding the lower portions of the object, b. a cover storage means resting upon the surface adjacent one end of the object to be protected, c. a pivoted dispensing arm movable in an arc extending from the storage means across to the opposite end of such object from the storage means and connected to the cover at the outer end of such cover, d. the weight and size of the cover and the length of the pivoted arm being related to the area and initial confined dimensions of the cover such that the descent of the cover and pivoted dispensing arm in the terminal portion of its descent is air buffered to be at a rate less than the rate that would be expected from the influence of gravity.

26. A pivoting arm arrangement for drawing a sheet of flexible weather resistant material from a storage roller mounted in a housing comprising:

a. an adjustable frame assembly for drawing flexible weather resistant material from a storage roller over a motor vehicle:

b. said frame assembly comprising:
  (i) a cross arm for connection to one end of the flexible weather proof material,
  (ii) an adjustable arm pivotally connected at one end to an adjustable spacing member and connected at the other to the cross arm,
  (iii) a handle connected to one of the cross arms and the adjustable arm, and c. resilient means associated with the storage roller for rotating the storage roller to rewind flexible material upon said storage roll after it has been unwound from the storage roll by drawing the handle away from the storage roller:

d. the adjustable arm and adjustable spacing member allowing the flexible weather resistant material to be drawn over and withdrawn from a variety of motor vehicles.

* * * * *